US007210207B1

(12) United States Patent
Frady et al.

(10) Patent No.: US 7,210,207 B1
(45) Date of Patent: May 1, 2007

(54) CLEVIS REMOVAL AND INSTALLATION TOOL AND METHOD OF USE

(76) Inventors: Shawn P. Frady, 722 Apple St., Beebe, AR (US) 72012; Aubrey Bailey, Jr., 112 Kirkwood Dr., Beebe, AR (US) 72012

( * ) Notice: Subject to any disclaimer, the term of this patent is extended or adjusted under 35 U.S.C. 154(b) by 76 days.

(21) Appl. No.: 11/183,008

(22) Filed: Jul. 18, 2005

(51) Int. Cl.
*B23P 19/04* (2006.01)
*B25B 19/00* (2006.01)

(52) U.S. Cl. ............................ 29/256; 29/255; 81/465

(58) Field of Classification Search .................. 29/256, 29/255, 263–265, 281.1, 269; 81/121.1, 81/124.1, 465
See application file for complete search history.

(56) References Cited

U.S. PATENT DOCUMENTS 4,984,489 A * 1/1991 Krauthamer ............... 81/124.2
5,048,378 A * 9/1991 Nikolas ..................... 81/124.2
5,433,850 A * 7/1995 Murray ....................... 210/361
6,010,154 A 1/2000 Payne et al.
6,805,029 B1 * 10/2004 Foster et al. .................. 81/186
6,871,401 B1 * 3/2005 Blankenship .......... 29/890.124
2005/0132850 A1 * 6/2005 Hamann et al. .............. 81/465

* cited by examiner

*Primary Examiner*—Lee D. Wilson
(74) *Attorney, Agent, or Firm*—Crossley Patent Law; Mark A. Crossley

(57) ABSTRACT

A clevis removal and installation tool comprising a socket with a centrally disposed engagement member within the socket, the engagement member perpendicularly anchored to a midline of the interior of the socket, the socket with an opening for removably fitting over a clevis, with the engagement member between two arms of the clevis, an engagement boss on an end opposite the socket opening, the boss comprising a square female opening, the opening for removably receiving a drive tool.

15 Claims, 6 Drawing Sheets

CLEVIS REMOVAL AND INSTALLATION TOOL AND METHOD OF USE

CROSS-REFERENCE TO RELATED APPLICATIONS

Not Applicable

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

1. Field of the Invention

The invention relates to specialized tools and more especially to a clevis removal and installation tool and method of use.

2. Description of the Prior Art

Various specialized tools are disclosed by the prior art. The tools are exemplary of the specialized nature of tool design required to correctly address and fit mechanical devices. The tools do not solve the problems encountered in removing and installing devises. By way of example:

U.S. Pat. No. 6,010,154 issued to Payne et al. on Jan. 4, 2000 discloses a device for use in operating a trailer landing gear drive mechanism. The device can be construed as a form of a socket for use with a reversible drill. While the device may be construed as a specialized socket, there are no other similarities to the present invention, including use.

U.S. Pat 2002/0194966A1 issued to Elmore on Dec. 26, 2002 discloses a specialized socket for manually sliding onto a valve adapted for use in a pipe line. The tool is a specialized socket but has no more similarity to the present invention.

U.S. Pat. No. 6,698,317 issued to Machovsky on Mar. 2, 2004 discloses a multi-purpose plumbing tool comprised of two sockets. The tool is designed for use with plumbing parts and more specifically for working on drain-waste-vent systems. The tool is quite dissimilar to the present invention.

The above-referenced prior art is exemplary of the nature of specialized tools and sockets in the arts of mechanical pursuits. Specialized tools typically require exact dimensions, curves, bends, leverages, and the like. Countless sockets exist in the art of tools. Countless sockets of an almost infinite variety are designed and produced in order to address the specific needs of tools While the above-described devices fulfill their respective and particular objects and requirements, they do not describe a clevis removal and installation tool that provides for the advantages of the present invention, therefore, a need exists for a clevis removal and installation tool, especially one capable of removing a clevis which is frozen to either a clevis lock nut, the threaded rod upon which a clevis mounts, or both. What is needed is a socket that properly fits a clevis, for turning the clevis off and onto a typical threaded rod upon which devises are typically mounted. In this respect, the present invention substantially departs from the conventional concepts and designs of the prior art.

SUMMARY OF THE INVENTION

In view of the foregoing disadvantages inherent in the known types of clevis removal and installation tool now present in the prior art, the clevis removal and installation tool overcomes the above-mentioned disadvantages and drawbacks of the prior art. As such, the general purpose of the clevis removal and installation tool, described subsequently in greater detail, is to provide a clevis removal and installation tool which has all of the advantages of the prior art mentioned heretofore and many novel features that result in an improved clevis removal and installation tool which is not anticipated, rendered obvious, suggested, or even implied by the prior art, either alone or in combination thereof.

To accomplish this, the clevis removal and installation tool comprises a rectangular parallelepiped socket. The socket is comprised of two spaced apart vertical sides perpendicularly joined by two spaced apart anchor sides. The vertical sides and the anchor sides form a socket and define an interior area therewithin. The vertical sides and anchor sides further comprise interior surfaces. An engagement member is fixed within the socket. The engagement member is perpendicularly anchored to the anchor side midlines of the interior surfaces of the two anchor sides. The engagement member is coplanar to and shorter than the length of the vertical sides of the socket. A closure is disposed at a first end of the socket. The closure has a closure interior surface and a closure exterior surface. An engagement boss has a first end and a second end. The first end of the engagement boss is attached to the closure exterior surface. Attachment of the closure exterior surface to the engagement boss further comprises reinforcement.

The second end of the engagement boss comprises a square female opening. The female opening removably receives square drive of a typical tool used for turning the socket. The socket opening of the invention is at an end of the socket opposite the closure. The invention thereby removably fits over and around a clevis. The typical clevis is comprised of clevis arms. Clevis arms fit inside the invention through the socket opening. The interior surfaces and the engagement member removably engage the clevis arms. A typical clevis and lock nut are threadably engaged with a typical threaded rod upon which a clevis mounts. The clevis backside is typically abutted by a lock nut.

The invention is manufactured in a variety of sizes to fit a variety of clevis pin sizes. Further, the invention is offered with various sized square female openings for the receipt of square drives of various sized driver tools. Sizes of the female openings of the engagement boss include but are not limited to ¼", ⅜", ½", ¾", and 1". The invention is utilized by sliding the invention around a clevis. The engagement member fits between and engages clevis arms of the clevis. The invention is turned in the selected direction by a square drive of an impact wrench, a breaker bar, a ratchet, or other typical driver tool, referred to herein as a driver. An impact wrench is preferably utilized as a driver when the lock nut or clevis is frozen on the threaded rod of a clevis installation. The impact wrench turns the invention clockwise or counter clockwise, as chosen by a user. Typically, a wrench is utilized to engage a lock nut that typically abuts the back side of a clevis. The lock nut typically locks the clevis in position on the threaded rod.

Thus has been broadly outlined the more important features of the clevis removal and installation tool so that the detailed description thereof that follows may be better understood and in order that the present contribution to the art may be better appreciated.

Numerous objects, features and advantages of the clevis removal and installation tool will be readily apparent to those of ordinary skill in the art upon reading the following detailed description of presently preferred, but nonetheless illustrative, embodiments of the clevis removal and installation tool when taken in conjunction with the accompanying drawings.

In this respect, before explaining the current embodiments of the clevis removal and installation tool in detail, it is to be understood that the invention is not limited in its application to the details of construction and arrangements of the components set forth in the following description or illustration. The invention is capable of other embodiments and of being practiced and carried out in various ways. It is also to be understood that the phraseology and terminology employed herein are for purposes of description and should not be regarded as limiting.

Those skilled in the art will appreciate that the conception upon which this disclosure is based may readily be utilized as a basis for the design of other structures, methods and systems for carrying out the several purposes of the clevis removal and installation tool. It is therefore important that the claims be regarded as including such equivalent constructions insofar as they do not depart from the spirit and scope of the present invention.

Objects of the clevis removal and installation tool, along with various novel features that characterize the invention are particularly pointed out in the claims forming a part of this disclosure. For better understanding of the clevis removal and installation tool, its operating advantages and specific objects attained by its uses, refer to the accompanying drawings and description.

DETAILED DESCRIPTION OF THE PREFERRED EMBODIMENT

Figure 2:
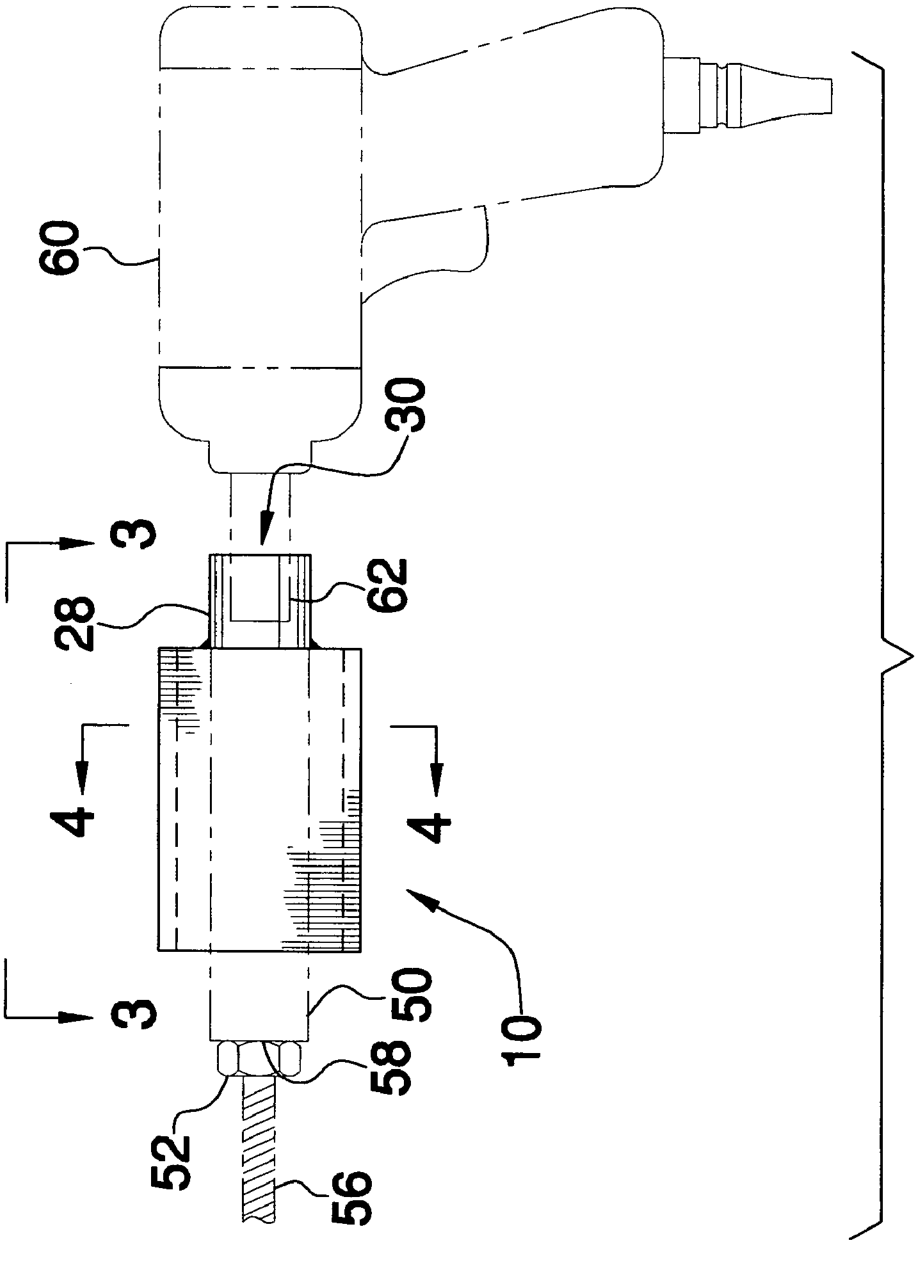
FIG. 2 is a lateral elevation of the invention removably installed on a clevis, the invention removably fitted with a typical impact wrench.

The broken lines showing an exemplary power drive in FIG. 2 are for illustrative purposes only and form no part of the claimed tool.

With reference now to the drawings, and in particular FIGS. 1 through 5 thereof, the preferred embodiment of the clevis removal and installation tool employing the principles and concepts of the present invention and generally designated by the reference number 10 will be described.

Figure 1:
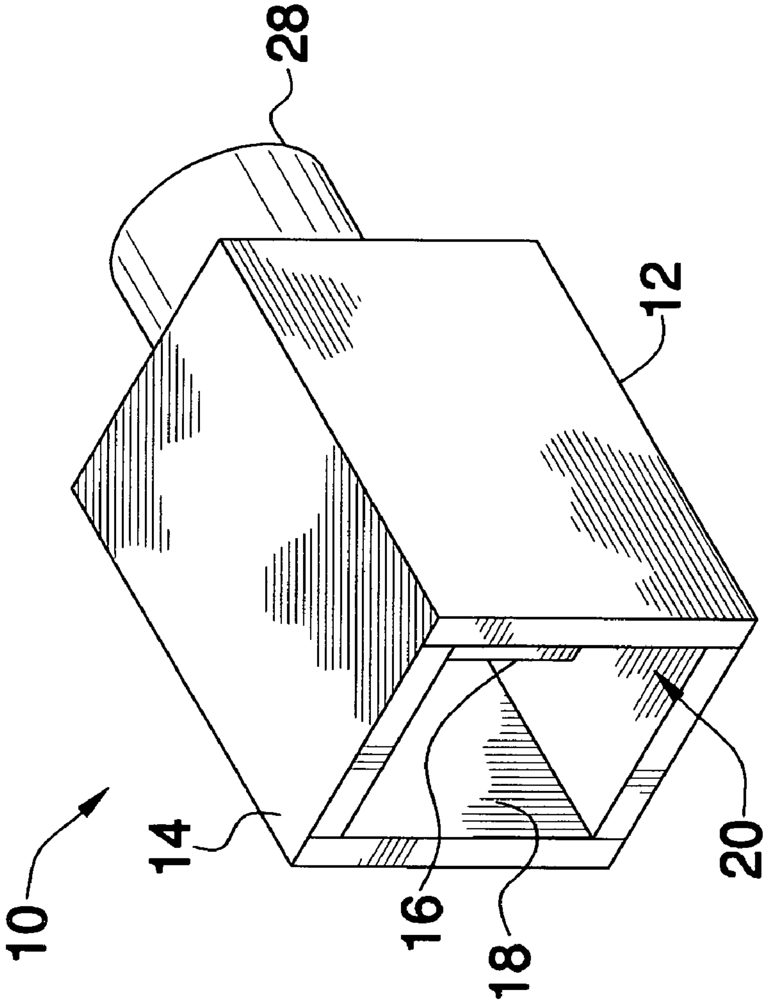
FIG. 1 is a perspective view of the invention.

Referring to FIG. 1, the clevis removal and installation tool 10 comprises a rectangular parallelepiped socket. The socket is comprised of two spaced apart vertical sides 12 perpendicularly joined by two spaced apart anchor sides 14. The vertical sides 12 and the anchor sides 14 form a socket and define an interior area therewithin. Interior surfaces 18 are within the area defined by the vertical sides 12 and the anchor sides 14. An engagement member 16 is fixed within the socket. The engagement member 16 is perpendicularly anchored to the anchor side midlines 15 of the interior surfaces 18 of the two anchor sides 14 (FIG. 4). The engagement member 16 is coplanar to and shorter than the vertical sides 12 of the socket. A closure 22 is disposed at a first end of the socket. The closure 22 has a closure interior surface 24 and a closure exterior surface 26. An engagement boss 28 has a first end and a second end. The first end is attached to the closure exterior surface 26. Attachment of the closure exterior surface 26 to the engagement boss 28 further comprises reinforcement 32 (FIG. 3).

Figure 3:
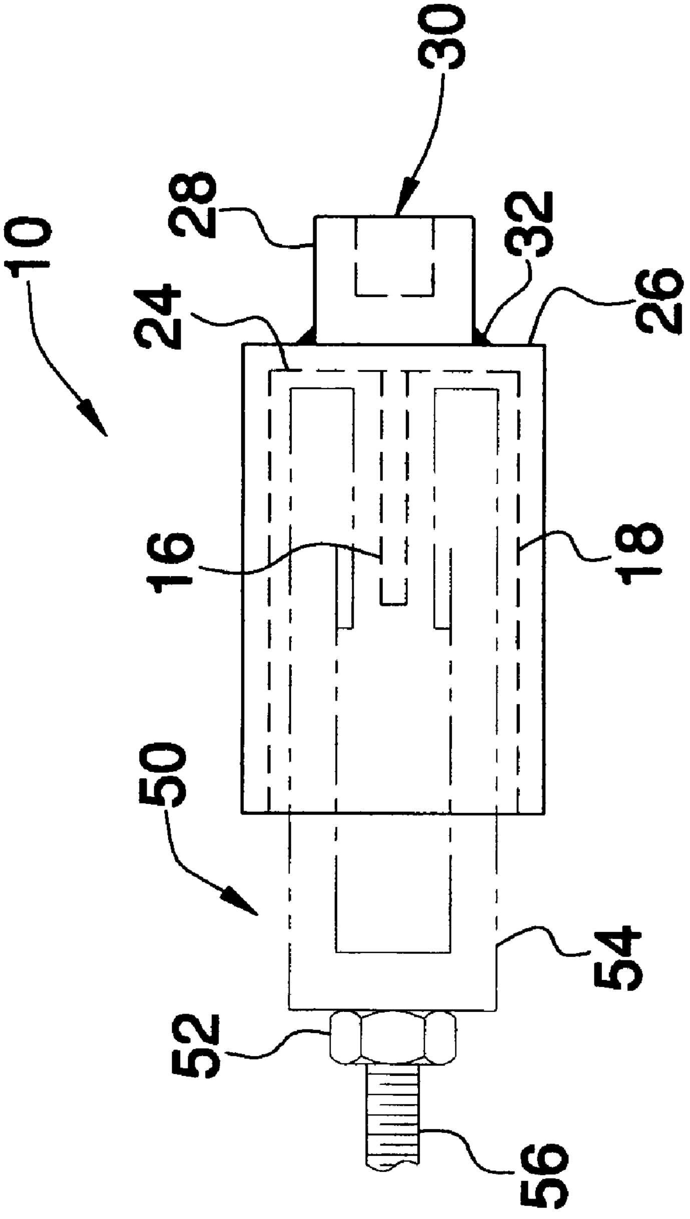
FIG. 3 is a cross sectional view of the invention of FIG. 2 installed on a clevis, the view taken along the line 3—3.
Figure 4:
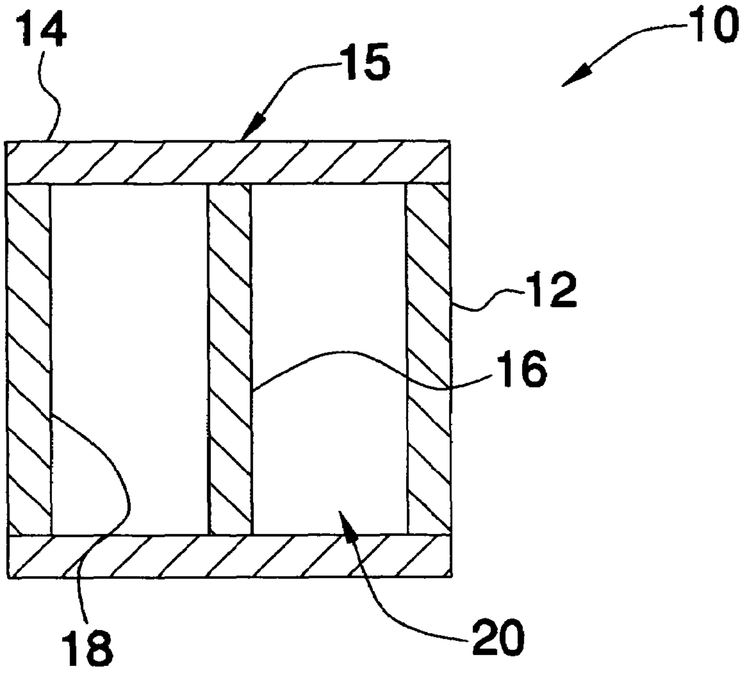
FIG. 4 is an end view of the socket opening of the invention of FIG. 2, taken along the line 4—4.
Figure 5:
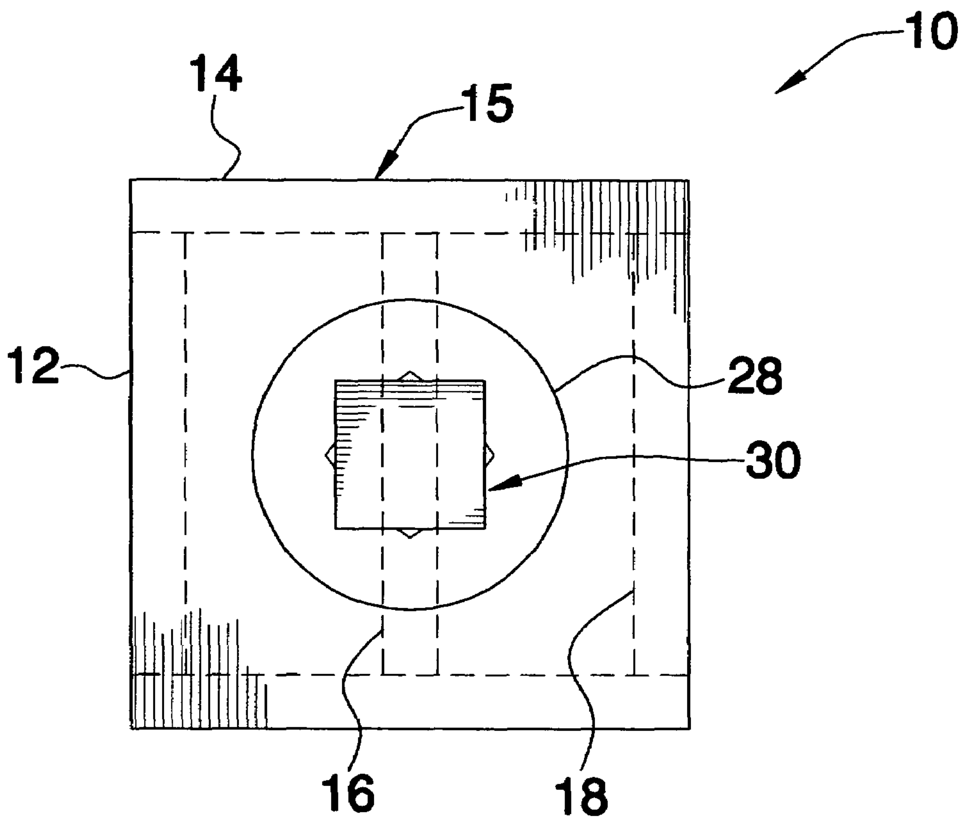
FIG. 5 is an end view of the invention, the end of the engagement boss.
Figure 6:
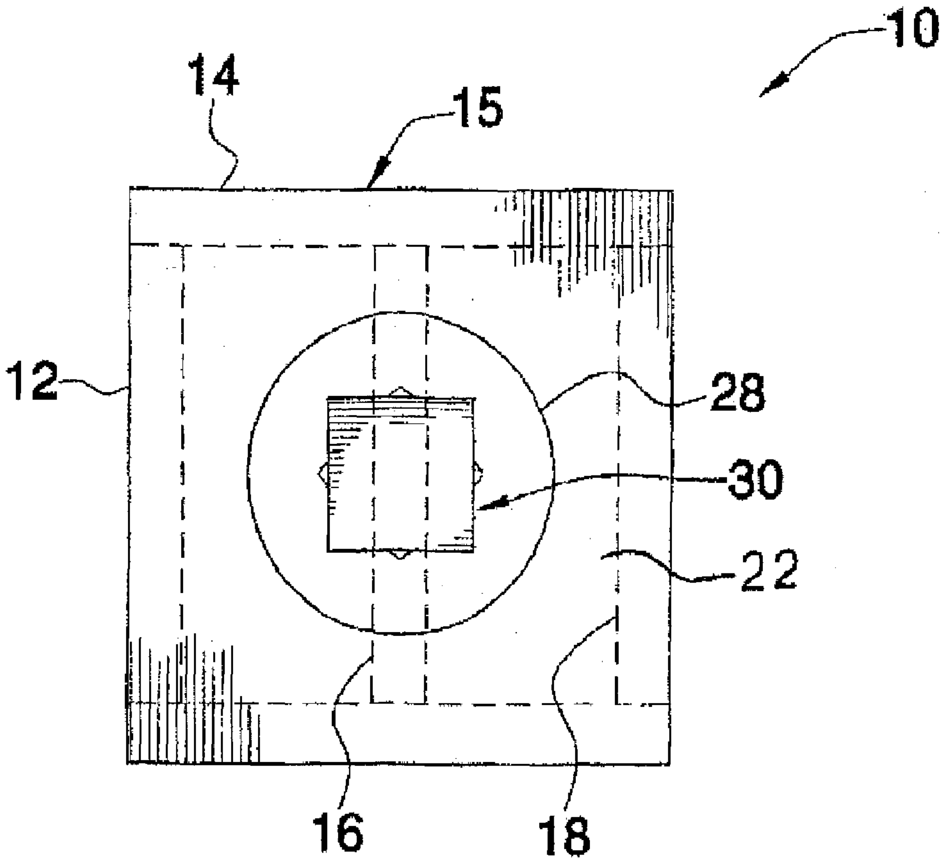
FIG. 6 is an end view.

Referring to FIGS. 2, 3, and 5, the second end of engagement boss 28 comprises a square female opening 30 (FIG. 5). Female opening 30 removably receives square drive 62 of impact wrench 60. The socket opening 20 of the invention 10 is at an end of the socket opposite closure 22. The invention 10 thereby fits over and around a clevis 50. Clevis 50 is comprised of clevis arms 54. Clevis arms 54 removably fit inside invention 10. Interior surfaces 18 and engagement member 16 removably engage clevis arms 54. Typical clevis 50 and lock nut 52 are threadably engaged with typical threaded rod 56. Clevis backside 58 is abutted by lock nut 52.

Referring to FIG. 2, the invention 10 is utilized by sliding the invention 10 around clevis 50. Engagement member 16 fits between and engages clevis arms 54. The invention 10 is turned in the selected direction by square drive 62 of impact wrench 60. Impact wrench 60 turns invention 10 either clockwise or counter clockwise, as chosen by a user (not shown). Typically, a wrench (not shown) is utilized to engage lock nut 58.

With respect to the above description then, it is to be realized that the optimum dimensional relationships for the parts of the clevis removal and installation tool, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A clevis removal tool, comprising:

a rectangular parallelepiped socket comprising two spaced apart vertical sides perpendicularly joined by two spaced apart anchor sides, the sides defining an area therein with interior surfaces; an engagement member within the socket, the engagement member perpendicularly anchored to a midline of the interior surfaces of the two anchor sides, the engagement member coplanar to the vertical sides of the socket; a closure at a first end of the socket, the closure having an interior surface and an exterior surface; an engagement boss with a first end and a second end, the first end attached to the exterior surface of the closure, the engagement boss for engaging and turning the socket; an opening at a second end of the socket, whereby the socket fits over a clevis and the engagement member between two arms of the clevis.

2. The tool in claim 1 wherein the second end of the engagement boss further comprises a square female opening, the opening removably receiving a square drive tool.

3. The tool in claim 2 wherein a dimension from one side of the square female opening to an opposite side of the square female opening is selected from a group consisting of ¼", ⅜", ½", ¾", and 1".

4. The tool in claim 3 wherein the engagement member extends from the interior surface of the closure to a distance less than a length of the socket interior surfaces.

5. The tool in claim 4 wherein the attachment of the second end of the engagement boss to the exterior surface of the closure further comprises reinforcement.

6. A clevis removal tool, comprising:

a rectangular parallelepiped socket comprising two spaced apart vertical sides perpendicularly joined by two spaced apart anchor sides, the sides defining and area therein with interior surfaces;

an engagement member within the socket, the engagement member perpendicularly anchored to a midline of the interior surfaces of the two anchor sides, the engagement member coplanar to and shorter than the vertical sides of the socket;

a closure at a first end of the socket, the closure having an interior surface and an exterior surface;

an engagement boss with a first end and a second end, the first end attached to the exterior surface of the closure, the second end of the engagement boss further comprising a square female opening, the female opening for engagement by a square drive tool;

an opening at a second end of the socket, whereby the socket fits over a clevis and the engagement member between two arms of the clevis, whereby the drive tool turns the socket to turn the clevis.

7. The tool in claim 6 wherein the attachment of the first end of the engagement boss to the exterior surface of the closure further comprises reinforcement.

8. A method of using a clevis removal and installation tool for removing and installing a clevis on a threaded rod, the tool having an engagement member, the engagement member perpendicularly anchored to a midline of the interior surfaces of the two anchor sides, the engagement member coplanar to the vertical sides of the socket, the method comprising the steps of:

(a) providing the clevis tool;

(b) engaging a square male end of a driver within a female opening of the tool;

(c) grasping a lock nut of the threaded rod with a wrench;

(c) sliding the clevis removal and the installation tool over clevis arms of the clevis;

(d) turning the clevis removal and the installation tool with the drive tool, thereby rotating the clevis upon the threaded rod.

9. The method of claim 8 wherein a dimension from one side of a square female opening to an opposite side of the square female opening of the clevis tool is selected from a group consisting of ¼", ⅜", ½", ¾", and 1".

10. The method of utilizing the clevis removal and installation tool of claim 8 wherein an engagement member of the tool extends from an interior surface of a closure of the tool to a distance less than a length of tool socket interior surfaces.

11. The method of utilizing the clevis removal and installation tool of claim 9 wherein an engagement member of the tool extends from an interior surface of a closure of the tool to a distance less than a length of tool socket interior surfaces.

12. The method of using the clevis removal and installation tool of claim 8 wherein the driver for engaging the female opening is a ratchet.

13. The method of using the clevis removal and installation tool of claim 8 wherein the driver for engaging the female opening is an impact wrench.

14. The method of using the clevis removal and installation tool of claim 8 wherein the driver for engaging the female opening is a breaker bar.

15. The method of using the clevis removal and installation tool of claim 8 wherein the driver for engaging the female is an extension of the driver.

* * * * *